Jan. 17, 1956  D. H. POST  2,731,072
PORTABLE WALKER, CAR SEAT AND HIGH CHAIR COMBINATION
Filed June 8, 1953  2 Sheets-Sheet 1
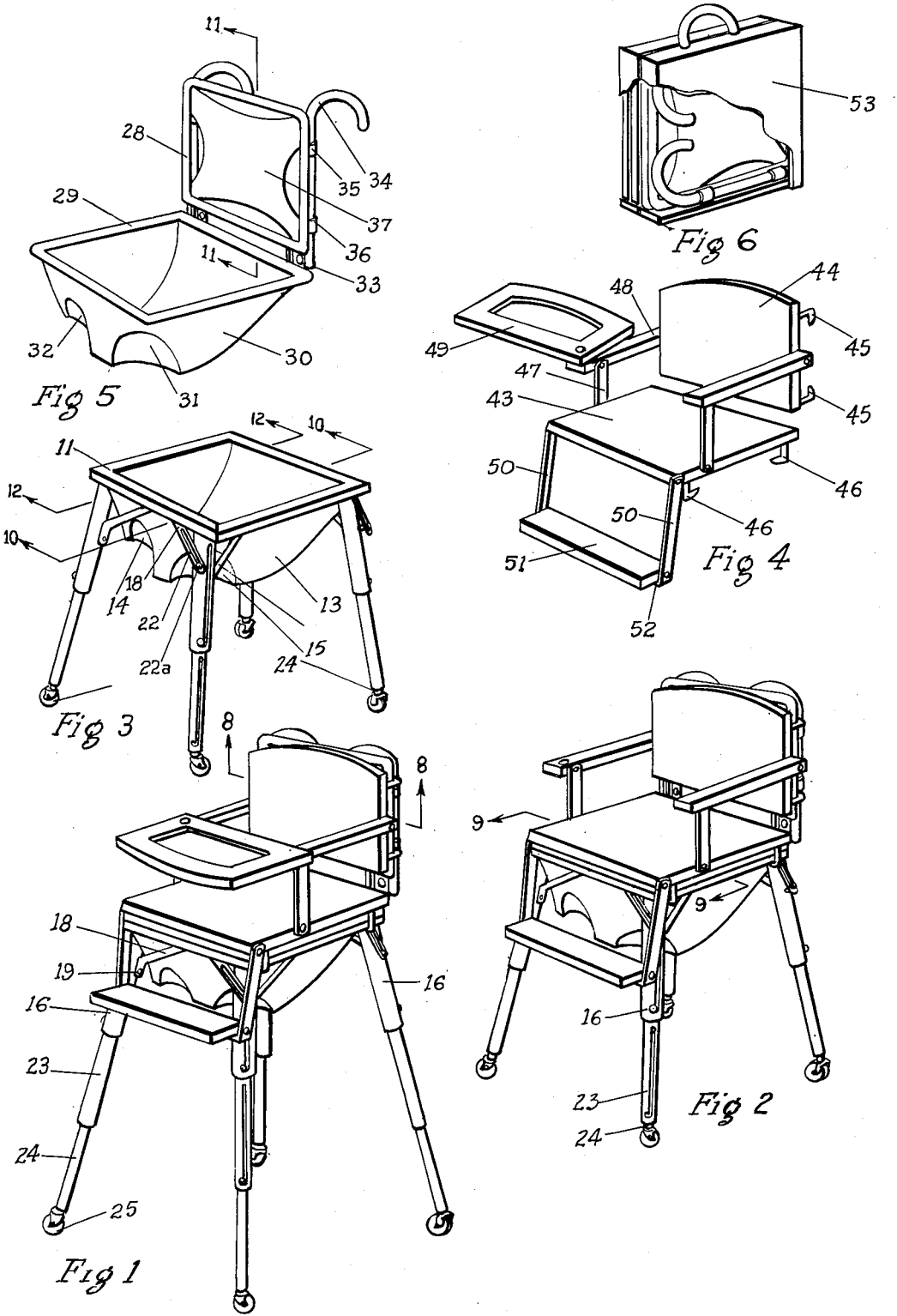

Jan. 17, 1956  D. H. POST  2,731,072
PORTABLE WALKER, CAR SEAT AND HIGH CHAIR COMBINATION
Filed June 8, 1953  2 Sheets-Sheet 2

United States Patent Office 2,731,072
Patented Jan. 17, 1956

2,731,072

PORTABLE WALKER, CAR SEAT AND HIGH CHAIR COMBINATION

Daniel H. Post, Abilene, Tex.

Application June 8, 1953, Serial No. 360,168

4 Claims. (Cl. 155—38)

My invention relates to furniture, and in particular to combinations of several articles of furniture being a walker, a car seat and high chair fitting together one on top of the other, and, when so fitted together, all collapsible so that the entire combination of articles of furniture may be fitted into a small carrying case and carried about.

The object of my invention is to provide a walker unit which may be set up and used by itself, a car seat unit fitting over the walker unit, having its own canvas breeches, which may be removed and set up on the upholstery of the automobile, and the seat and back of a high chair unit, having the seat fitting over the seats of the car seat unit and the walker unit, and the back fitting over the back of the car seat unit; and to so arrange the three said units that when in position one on top of the other they may be collapsed, fitted into a carrying case, and carried about.

My combination is designed for use by a party touring with one or two children, which may use the car seat for one child while the other child is using the walker, but in general it is adapted particularly for use by a touring party of which includes only one child. If a high chair is desired for use in a restaurant the whole combination may be so set up; if a car seat only is desired it may be separated and set up in the automobile, and the top and bottom elements put back in the suit case; and if a walker only is desired, it may be removed from beneath the other two elements and set up, putting the two top elements back in the case.

A further object of my invention is to arrange the parts so that they will not need adjustment, or any wrench, pliers or screw driver for assembling and disassembling the combination, but will be given permanent adjustment in the factory, and will therefore open and set up, or collapse and fold, entirely by hand.

With these and other objects in view my invention resides in the particular arrangement and combination of parts, herein fully set forth, and particularly described in the claims.

Referring now to the drawings, in which like characters indicate like parts,

Fig. 1 is a perspective view of all the units of furniture combined and set up as a high chair;

Fig. 2 is a perspective view of the same with the chair legs shortened by telescoping;

Fig. 3 is a perspective view of the walker unit;

Fig. 4 is a perspective view of the upper part of the high chair removed from the car seat unit and from the walker unit;

Fig. 5 is a perspective view of the car seat unit with its breeches canvas;

Fig. 6 is a perspective view of the carrying case with its sides cut back to indicate the combination of furniture units folded and held therein;

Figure 7:
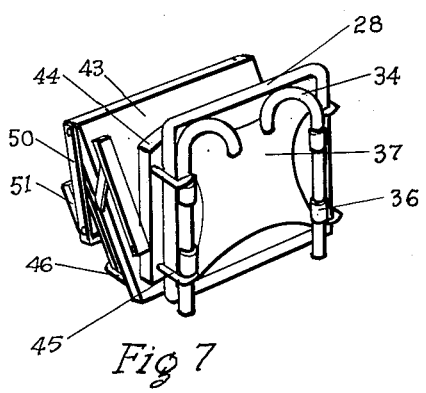
Fig. 7 is a perspective view of the combination of furniture units in process of being folded for placing in the carrying case.
Figure 8:
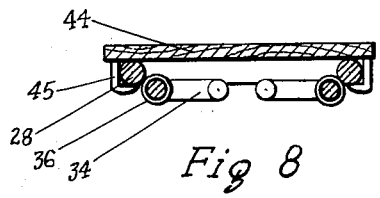
Fig. 8 is a horizontal section of the backs of the car seat unit and the high chair unit looking upward on the line 8—8 of Fig. 1.
Figure 9:
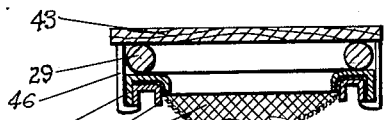
Fig. 9 is a vertical section of the combination of units looking forward on the line 9—9 of Fig. 2.
Figure 10:
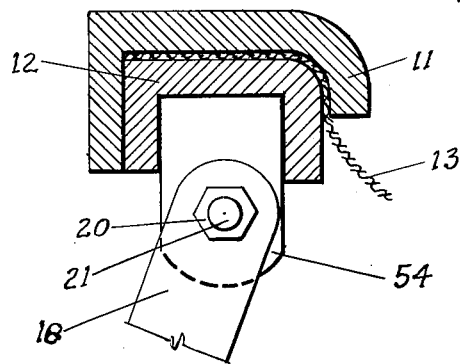
Fig. 10 is a detail side view taken in vertical section on the line 10—10 of Fig. 3 showing the attachment of the brace 18 to the frame of the walker unit.

The walker unit, shown in Fig. 3, is the lowest of the several units of the combination, and may be considered as the base upon which the other units are superimposed and assembled. This walker unit has a flat rectangular frame 12 composed of channel irons mitred and welded together at the corners so as to surround a rectangular open space. In this space is placed the breeches canvas 13, having a right leg hole 14, and left leg hole 15, the edges being cut to fit over the outer edges of the frame 12. Over this frame 12 is placed a similar rectangular frame 11, also composed of channel irons mitred and welded together adapted to fit over the frame 12 and hold the canvas 13 tight between the top surface of frame 12 and the inside surface of the channels of frame 11. It will be noted that the channels of frame 11 are rounded on the side of the central space so as not to offer a sharp corner on which the child using the breeches canvas could be hurt.

To each corner of the frame 12 I attach the top portion 16 of a round telescoping leg by means of a pin 17 passing through a hole in the outer leg of the channel iron, then through diametric holes in the top portion 16 and finally seating itself in a recess in the inner leg of the channel iron. After the frame 11 has been imposed over the frame 12 the pin 17 will be kept in place. The telescoping leg may then swing about the pin 17 down to vertical position, and back to horizontal position in the valley of the frame 12.

For each of the legs of a folding table it is usual to have a brace such as the member 18, fastened at one end to the leg unit 16, and at the other end swinging on a bolt or rivet 20, held by a nut or rivet head 21, said bolt or rivet 20 being mounted in a U-shaped clip 54 inverted so that its top may be welded to the valley of the channel of the frame 12. The telescoping leg when telescoped will not take up all of the valley of the frame 12 between corners, leaving room at one corner for the clip 54, and at the other for the pin 17 on which the leg swings. As is usual in such construction for each leg there is a latch and brace member 22, the lower end pivotally attached to the leg portion 16 by means of the pin 22a fastened thereto, and the remainder of said member 22 having a central slot extending nearly to the upper end of said member, said slot having an offset extending upwards at its upper end. A second pin, not shown, is horizontal and fastened to the frame 12 so that its head will cover the slot, and the member 22 as extended may be latched to the pin.

The telescoping leg consists of an upper outer portion 16, and middle portion 23 sliding within same, and a bottom portion 24 sliding within the middle portion 23. It is desirable to lock one portion which is in extended position to the portion outside it. This may be done in a number of ways, but I have provided the outer portion 16 and the middle portion 23 each with a longitudinal slot. In the slot of the outside portion 16 travels the two headed rivet 26 extending from the inside of the tube 23 to the outside of the tube 16. In the slot of the middle portion 23 travels the stud rivet 27 having its head inside the tube 24. At the bottom of each longitudinal slot there is an offset notch so that by turning the inner of the two tubes a bayonet lock is obtained. When it is desired to telescope the legs the bayonet lock may be released by turning the inner tube, releasing it for telescoping. At the bottom of the inner or bottom tube 23 the cylindrical space is adapted to receive and hold the shank of the castor 25.

It will be noted, that for the sake of better showing the structure, the telescoping legs are shown with the slots and the rivet 26 is shown on the outside, but it will probably be found preferable to turn the legs so that these features are to be seen only from the inside, and similar changes may be made as to other parts which are considered better to have concealed.

On top of the walker unit shown in Fig. 3 I place the car seat unit having a second breeches canvas 30, provided with leg holes 31 and 32, which is attached in any suitable manner to the rectangular frame 29 bent out of a round rod, corresponding in size to the rectangular frame 11 and resting upon it in assembled position.

Figure 11:
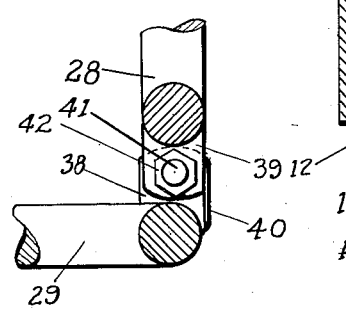
Fig. 11 is a detail side view taken in vertical section on the line 11—11 of Fig. 5 showing the hinge connection between the frame for the canvas breeches of the car seat unit and the back of that unit.
Figure 12:
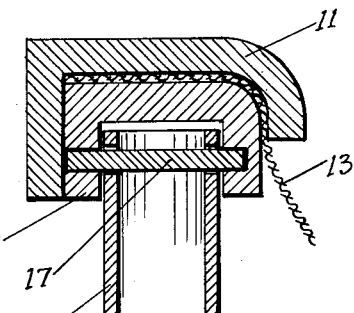
Fig. 12 is a detail side view in vertical section on the line 12—12 of Fig. 3 showing the attachment of a telescoping leg to the frame of the walker unit.
Figure 13:
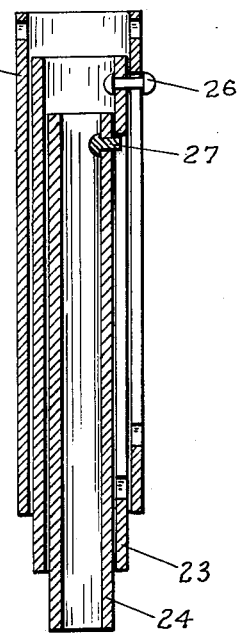
Fig. 13 is a detail view in diametric section of one of the telescoping chair legs.

As shown in Fig. 11 at each of the rear corners of the frame 29 there is welded an upstanding lug 38 through which passes a bolt 40 to serve as a hinge pin. Matching each lug 38 is a lug 39 depending from the round rod rectangular frame 28 of the back of the car seat unit. The bolt or rivet 41 passes through the matching lugs 38 and 39 and is fastened by the nut or head 42 so that at each of the two corners there is a hinge on which the frame 28 may be swung down over the frame 29, and back to vertical position, its travel being limited to a quadrant by the stop 40, which extends from lug 38 parallel to the frame 29 and back of the lug 39.

Back of the vertical rectangular frame 28 are the vertical sliding hooks 34 each formed out of a round rod and having a straight vertical portion and a bent over hook portion which is adapted to fit over the upholstery of the automobile so that the two hooks will support the car seat unit. Each of these hooks 34 is held by two clips 35 and 36 positioned one over the other and each fastened to the riser of the vertical frame 38. The clip, 35 or 36, surrounds the vertical portion of the hook 34, and holds it fairly tight so that the hook 34 has to be pulled against friction to the proper extended position after turning the hook so that the bent portion is at right angles to the frame 28, the proper position being that which will hold the canvas breeches 30 at a height suitable for the legs of the child. The hooks 34 when turned back parallel to frame 28 should be held by friction, but, if found necessary to hold each hook 34 in that position a dowel pin can be placed on the hook 34 to fit into a bayonet slot in the clip 35. The bottom end of each hook 34, as at 33 may be enlarged by hammering so that it will not pass through the clip 36. In the rectangle made by the frame 28 I place a canvas 37 fastening same to the frame in any suitable manner so that it will protect the upholstery of the automobile from contact with the body of the child sitting in the breeches canvas 30.

On top of the car seat unit as shown in Fig. 5 I place the high chair unit as shown in Fig. 4. The seat 43 of this unit is solid, either of metal or of wood, and is of such size as to fit over frame 29 and frame 11. At each of the corners it has a turn hook 46 by which it is fastened to the bottom of frame 11. The back piece 44 also is solid, and is fastened to frame 28 by turn hooks 45. An arm 48 is pivoted to and extends forward from back piece 44, and is joined near its end by a strap support 47 pivoted to the arm 48 at the top, and to the seat 43 at the bottom. At the forward end of left arm 48 is mounted on a pivot 55 the tray 49 so that it may swing horizontally into position in front of the child. The pivot 55 passes through and is held by the tray 49 into which is sunk and held a short length of pipe in which the pivot 55 may turn freely. At each front corner of the seat 43 is pivoted a strap 50 running down to the end of the treadle 51 and pivoted thereto at 52. This treadle 51 swings over the seat 43 when the high chair is collapsed, and the arms 48 go alongside the back 44.

Upon unpacking my combination of units from the carrying case 53 I first unfold the telescoping legs of the walker unit, setting them up with either two portions extended, as shown in Figs. 2 and 3, or with all three portions extended, as shown in Fig. 1. The high chair unit will then be in folded position, with the treadle 51 and straps 50 folded over so as to lie flat on the seat 43. The back 44 is folded over the seat 43, and, at each side of the back 44 an arm support 47 and chair arm 48 will both be collapsed into horizontal position. The tray 49 is separated from the arm 48, and loosely held in the carrying case 53.

To bring the high chair unit into position for use it is necessary only to bend the chair back 44 into vertical position when the arms 48 will rise continuing in horizontal position and the arm supports 47 will become vertical. The treadle 51, carried by the straps 50 can then be swung down into position in front of the seat 43. The tray 49, loosely held, is then mounted across the chair arms 48 with the pivot 55 in its socket.

To separate the car seat unit from the combination the turn hooks 46 which hold the seat 43 to the frame 11 are loosened, and also the turn hooks 45 which hold the chair back 44 to the frame 28 of the car seat unit. The high chair unit can then be lifted off, and, to get it out of the way, can be collapsed and put in the case 53. The frame 29 of the car seat unit will then rest loosely on top of the frame 12 of the walker unit. The hooks 34 of the car seat unit are then turned to be at right angles to the frame 28, and are adjusted for height by sliding in the clips 35 and 36, so that they can be hung on the upholstery of the automobile. The walker unit will then be set up for use as it stands beneath the car seat unit, but, if not desired to so use it at that time, it may be collapsed and put back in the carrying case 53.

In collapsing and packing away my combination of units substantially the reverse procedure is followed. The car unit is placed on top of the walker unit, and the high chair unit is placed on top of the walker unit with the seat fastened by the turn hooks 46 to the frame 11, and the back fastened by the turn hooks 45 to the frame 28. The high chair unit is then collapsed by bending up the treadle 51, and bending down the back 44 to carry the arms 48 down with it; and the tray 49 is set one side to go into the case 53. The telescoping legs of the walker unit are then folded against the frame 11, and the three units fastened together and collapsed can then go into the carrying case 53.

What I claim as new, and desire to secure by Letters Patent of the United States, is:

1. A walker unit having a flexible seat fastened upon a rectangular frame, said frame having supporting legs hinged thereto and foldable against the frame, a car seat unit having a flexible seat fastened upon a second rectangular frame, which frame has on one side upstanding hinge supports extending upwards at right angles thereto, said car seat unit having for its back a third rectangular frame hinged to the top of said hinge supports to swing through a right angle only to a position parallel to but distant from said second frame, a seat placed on top of and covering said second rectangular frame provided with means for fastening it to the under side of the first rectangular frame, and a back placed in front of and covering said third rectangular frame provided with means for fastening it to said frame.

2. A combination of units as specified in claim 1, said seat and back fitting in the space above the second frame and below the third frame when the latter is swung to horizontal position.

3. An underlying horizontal rectangular frame, a second rectangular frame for the seat portion of a car seat unit resting on top of said first rectangular frame, said second frame having on one side thereof upstanding hinge supports extending upwards at right angles thereto, a third rectangular frame for the back portion of said car seat unit hinged to the top of said hinge supports to swing through a right angle only to a position parallel to but distant from said second frame, a pair of hooks carried by said third rectangular frame flat against same, but adapted to be turned at right angles to same to provide means for supporting said back and seat portion when separated from said underlying frame, a seat placed on top of and covering said second rectangular frame provided with means for fastening it to the under side of said underlying rectangular frame, and a back placed in front of and covering said third rectangular frame provided with means for fastening it to said frame, said seat and back fitting into the space above said second frame and below said third frame when the latter is swung to horizontal position.

4. An underlying horizontal rectangular frame, a second rectangular frame for the seat portion of a car seat unit resting on top of said first rectangular frame, said second frame having on one side thereof upstanding hinge supports extending upwards at right angles thereto, a third rectangular frame for the back portion of said car seat unit hinged to the top of said hinge supports to swing through a right angle only to a position parallel to but distant from said second frame, a seat placed on top of and covering said second rectangular frame provided with means for fastening it to the underside of said underlying rectangular frame, a treadle connected to the seat by two arms to swing in front of said seat, a back placed in front of and covering said third rectangular frame provided with means for fastening it to said frame, two chair arms, one on each side and back, having their respective rear ends pivoted to said back, an arm support for each of said chair arms pivoted to said seat and to the front end of the chair arm to provide for motion parallel to said seat as said back is bent forward, said seat, treadle, chair arms, arm supports and back fitting into the space above said second frame and below said third frame when the latter is swung to horizontal position.

References Cited in the file of this patent
UNITED STATES PATENTS

| | | |
|---|---|---|
| 160,421 | Gratz | Mar. 2, 1875 |
| 1,356,493 | Kerr | Oct. 19, 1920 |
| 1,673,988 | Nitti | June 19, 1928 |
| 1,716,746 | Tyner | June 11, 1929 |
| 1,967,533 | Koop | July 24, 1934 |
| 2,399,792 | Copp | May 7, 1946 |